May 9, 1961 A. S. GUERARD, JR., ET AL 2,983,324
CONTINUOUS NET WEIGHING MECHANISM
Filed March 25, 1955 4 Sheets-Sheet 1

INVENTORS
ALBERT S. GUERARD, JR.
RUFUS P. RANNEY
DONALD H. REESE
BRUCE MACDONALD
BY
ATTORNEY

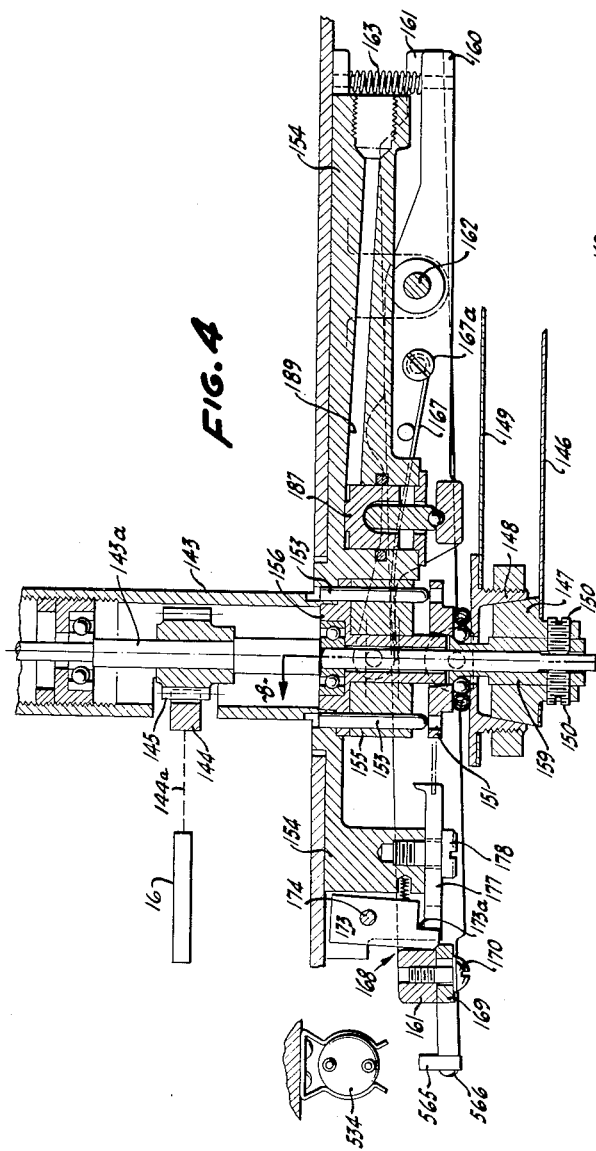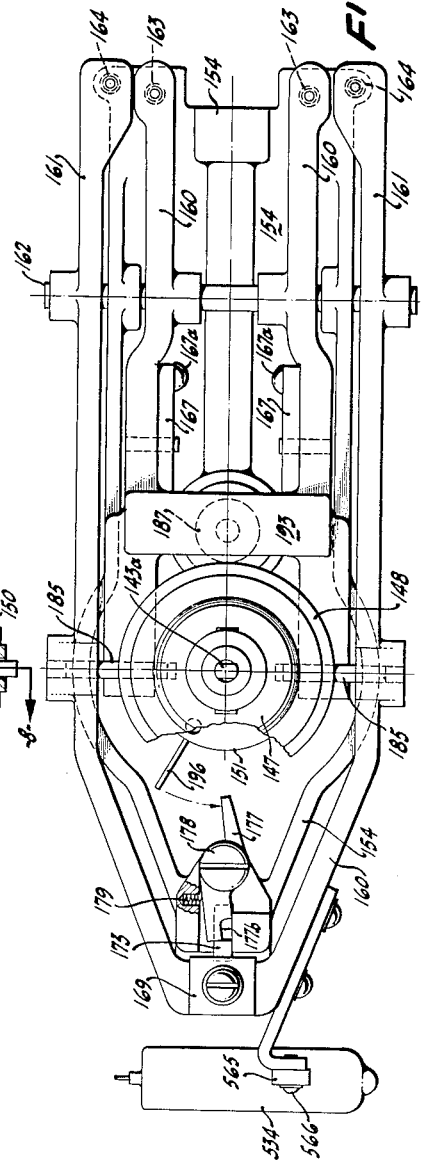

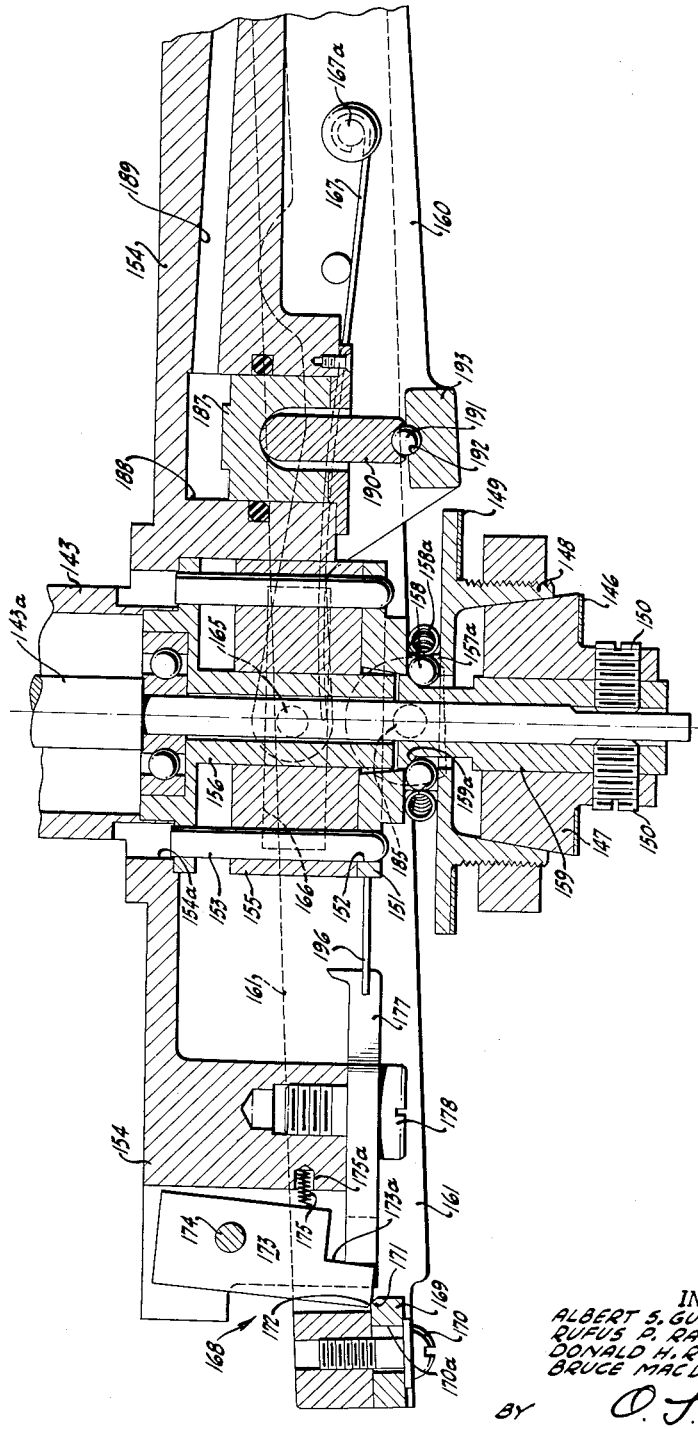

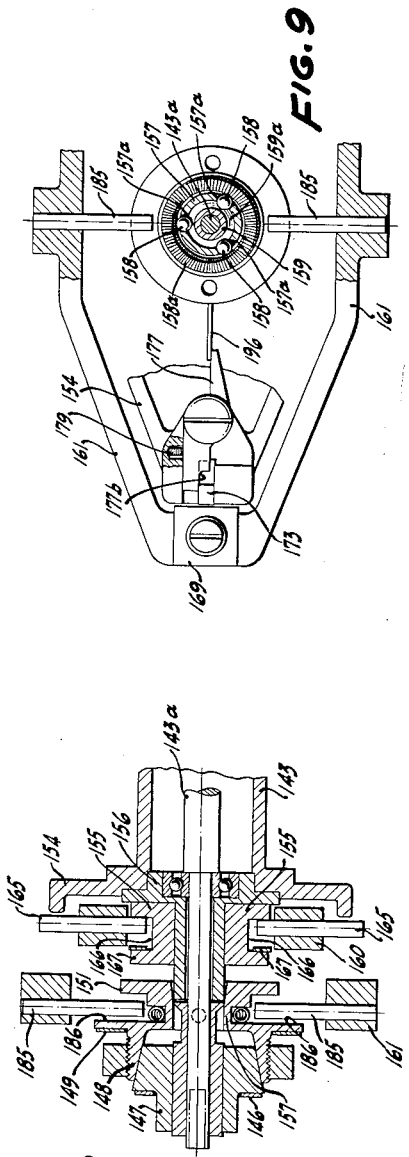
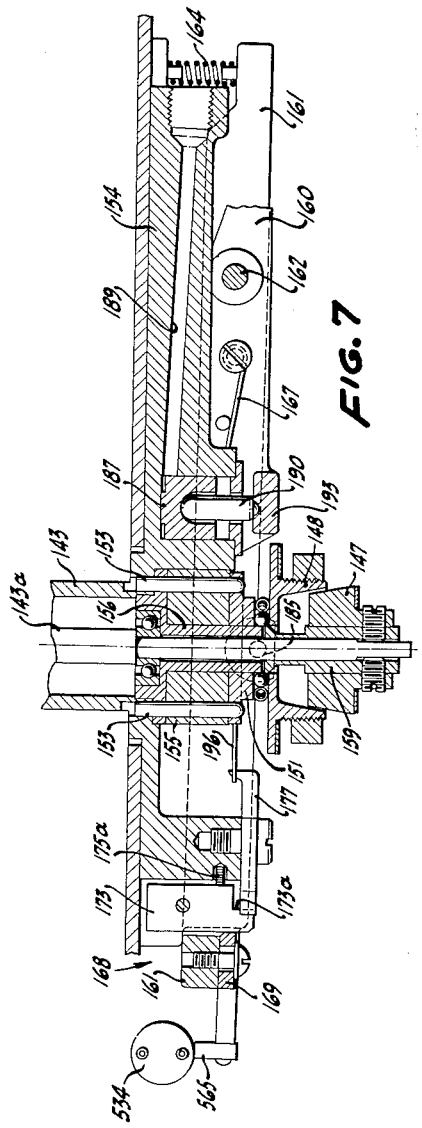

United States Patent Office 2,983,324
Patented May 9, 1961

---

2,983,324

CONTINUOUS NET WEIGHING MECHANISM

Albert S. Guerard, Jr., Berkeley, Rufus P. Ranney, San Rafael, Donald H. Reese, Lafayette, and Bruce Mac-Donald, South Gate, Calif., assignors, by direct and mesne assignments, to California Research Corporation, San Francisco, Calif., a corporation of Delaware Filed Mar. 25, 1955, Ser. No. 496,798

10 Claims. (Cl. 177—52)

This invention relates to apparatus for automatically and continuously measuring the net weight of a barrel, drum or other vessel as it is being filled with a liquid or other material.

This application is a continuation-in-part of our copending application Serial No. 307,554, filed September 2, 1952, entitled "Drum Filling Machine", which is hereinafter referred to as the "parent application." The said application issued May 28, 1957 as United States Patent No. 2,793,659.

More particularly this invention relates to apparatus intended to be used in conjunction with an automatic filling mechanism and preferably also in conjunction with an automatic orienting mechanism.

In the parent application there is described a barrel filling machine of this character, in which barrels or drums are supplied in succession to an orienting station with their bung holes in random position; each barrel is rotated at the orienting station until its bung hole is located in a predetermined position; the oriented drum is then transferred to a filling station with its bung hole still in the oriented position; the empty weight or tare of the drum is then sensed; the filling operation is then commenced and the net weight of the drum is continuously measured by an automatic weighing mechanism; and the filling operation is terminated when a predetermined weight of liquid has been delivered to the barrel or drum.

Among the difficulties involved in such an orienting, shifting and filling-and-weighing operation is the synchronization of the taring and net weighing operations with other steps in the operation, such that the tare of each empty, oriented drum is accurately determined before filling commences, and the filling and net weighing operation does not commence until all the various moving parts of the apparatus are in the proper condition. Where the moving and operating parts (mechanical, hydraulic, pneumatic and electrical) are numerous and complex, and where the operations are carried out at high speed, e.g.., one 55 gallon barrel per minute, the seriousness of this difficulty will be apparent.

It is an object of the present invention to provide a filling and weighing mechanism in which drums or other vessels can be supplied in rapid sequence to a filling and weighing station; the empty weight or tare of each vessel can be accurately determined or sensed when it is deposited at the filling and weighing station; the filling operation is commenced only after the tare of the vessel has been accurately sensed and after the entire mechanism is in a proper state of readiness; and a continuous net weighing operation proceeds during the filling operation until a predetermined net weight has been recorded.

A further object is to provide in conjunction with automatic filling apparatus, automatic gross weighing apparatus and automatic net weighing apparatus which initiates, controls and terminates operation of the filling apparatus, a time lag means whereby the filling apparatus and the net weighing apparatus are rendered inoperative until the gross weighing apparatus has accurately measured the tare of a vessel, and until all the apparatus is in the proper state of readiness for the filling and net weighing operation.

Yet another object of the invention is to provide a means for automatically depositing empty barrels or drums in sequence on a scale platform, weighing each empty barrel or drum, then initiating a filling and net weighing operation and continuing the same until a predetermined net weight is recorded, then terminating the filling operation, meanwhile insuring that the various operating parts of the mechanism are in a state of readiness when the filling and net weighing operation is commenced and restoring the mechanism, including the weighing apparatus, to its initial condition at the conclusion of the filling and weighing operation.

These and other objects of the invention will be apparent from the ensuing description and the appended claims.

One form of the invention is illustrated by way of example in the accompanying drawings, in which Figure 1 is a diagrammatic, top plan view of a drum or barrel orienting, weighing and filling apparatus such as described in the parent application.

Figure 4 is a view, partly in top plan and partly in horizontal section, of the weighing mechanism employed for taring empty drums and for weighing the liquid delivered thereto.

Figure 5 is a view in front elevation of the weighing mechanism of Figure 4, as seen from beneath Figure 4.

Figure 6 is a view generally similar to that of Figure 4 but on a larger scale and showing the weighing mechanism at a different stage of operation.

Figure 7 is a view similar to that of Figure 4 but showing the weighing mechanism at a third stage of operation.

Figure 8 is a fragmentary section taken along the line 8—8 of Figure 4.

Figure 9 is a fragmentary view, partly in front elevation and partly in section, generally similar to the view of Figure 5 but showing the weighing mechanism at a different stage of operation.

Figure 1:
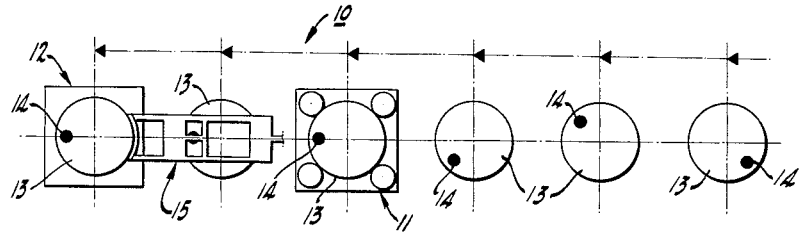

Referring now to Figure 1, a drum filling machine is there shown which is generally designated by the reference numeral 10 and is shown diagrammatically and in top plan view. It comprises an orienting station 11 and a filling and weighing station 12. Drums 13 are supplied to the machine from the right as viewed in Figure 1, with their bung holes 14 in random position. Each drum is oriented at the station 11 to bring its bung hole into a predetermined position, as illustrated. The orienting station 11 may be that described in the parent application, in which the drums are rotated while a finger (shown at 15a in Figures 2 and 3) rides the bung end of the drum, and in which the finger drops into the bung hole when the latter is rotated to a position of registry with the finger. This causes cessation of the drum rotation. Each of the oriented drums 13 is then transferred by a transfer or pusher mechanism 15 to the filling and weighing station 12. Referring now to Figure 3, the drum 13 is deposited at the filling station 12 on a scale platform 16 with its oriented bung hole 14 in registry with a filling lance 17. The latter is shown in solid lines in its elevated position. The pusher 15 is retracted, the lance 17 is dropped to its down position within the drum 13, as shown in broken lines, and the filling operation is commenced. Meanwhile the tare of the empty drum is first measured, and during filling, when a predetermined net weight has been measured, the flow from the lance 17 is stopped and the lance is withdrawn to its up position in readiness for the next empty drum. The filled drum is then removed manually or automatically to make way for the next empty drum. This completes a cycle of operation.

Figure 2:
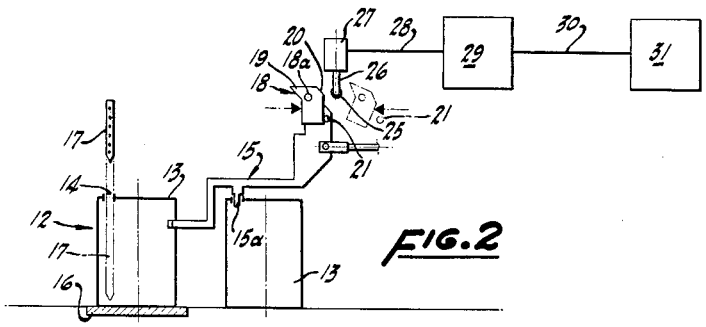
Figure 2 is a diagrammatic view in side elevation of the filling station shown in Figure 1.
Figure 3:
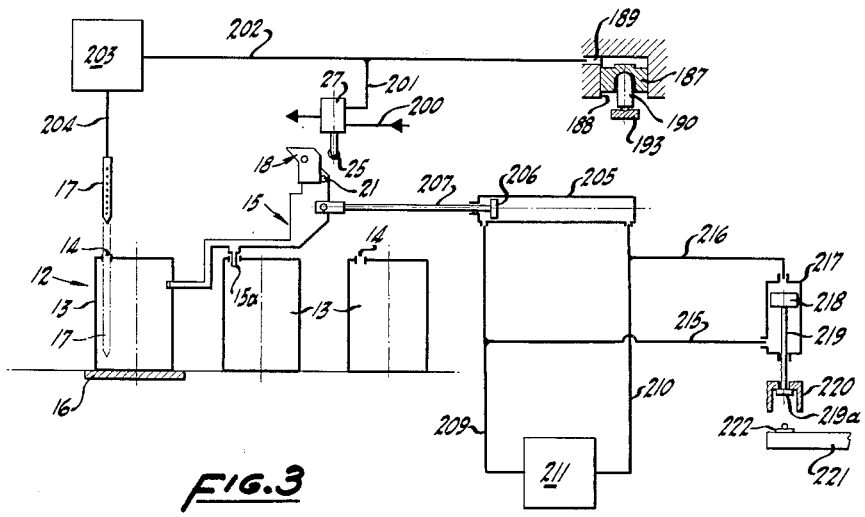
Figure 3 is a diagrammatic view generally similar to Figure 1 but in side elevation and showing also the control features of the apparatus.

In accordance with the present invention a cam 18 is provided which is pivotally mounted at 18a and is carried by the pusher member 15, such cam having a projecting tongue 19 at its forward end, or to the left as viewed in Figures 2 and 3, and a cam rise 20 at its rearward or right-hand end as viewed in Figures 2 and 3. The cam 18 is free to pivot clockwise (as viewed in Figures 2 and 3) but is restrained from pivoting counterclockwise by a stop member 21. The cam 18 is intended to engage a cam follower roller 25 at the lower end of the plunger 26 of a normally closed valve 27, in the manner and for the purpose described hereinafter. The valve 27 is fixed to the stationary framework of the apparatus and it is connected by means generally indicated at 28 to a control system which is generally indicated at 29 which, in turn, is connected by means generally indicated at 30 with a weighing mechanism 31 of which the scale platform 16 forms a part. Details of suitable control mechanism and weighing mechanism will be found in the parent application.

It is the purpose of the mechanism just described (the cam 18, the valve 27 and the control system 29) to actuate the weighing mechanism 31 to initiate the filling operation and the net weighing operation when, but not until, the empty drum on the platform 16 has been tared and the entire apparatus is in a proper state of readiness. It will be apparent that, during forward motion of the pusher means 15, the tongue 19 of the cam 18 will strike the roller 25 and, in so doing, the cam 18 will merely pivot clockwise as viewed in Figure 2 to the position shown in broken lines. On the return stroke of the pusher means 15, the cam rise 20 will contact the roller 25. Counterclockwise rotation of the cam is prevented by the stop member 21. Hence the cam rise 20 will push the plunger 26 upwardly and, in so doing, will open the normally closed valve 27. This will constitute a signal to the control system 29 and will cause the net weighing instrumentality of the weighing mechanism 31 to become operative. The same signal will also cause the lance 17 to descend and the filling cycle to commence.

As explained above, it is important that the gross weighing or taring of the empty drum 13 be brought to completion, that the empty weight or tare be sensed accurately, and that all elements of the apparatus be in a proper state of readiness, before commencement of the filling cycle and before commencement of the net weighing operation. This requires a properly timed delay, which is provided in accordance with the present invention by controlling the rate of rearward travel or retraction of the pusher means 15 and/or the distance of the valve 27 and its roller 25 from the scale platform 16.

For the purpose of taring the drums and weighing the liquid added, any of several known types of weighing apparatus may be used. One such apparatus is shown in detail in Figures 4 to 9 and is designated generally as 31. Referring to Figure 4, a torque shaft 143a is there shown which is enclosed in a housing 143 and is rotated by a load on the scale platform 16 (see Figure 2) through the medium of a rack 144 which is attached to the platform and a pinion 145 which is fixed to the torque shaft 143a. The scale platform 16 and a mechanical connection 144a between the scale platform and the rack 144 are shown diagrammatically in Figure 4 of the drawings.

Referring now more particularly to Figures 4 to 7, in Figure 4, a gross hand or tare hand 146 is fixed to an inner or male clutch element 147 which, in turn, is fixed to the torque shaft 143a and which is cooperable with an axially shiftable female clutch element 148 to which a net hand 149 is fixed. The clutch element 147 is fixed to the torque shaft 143a by means of set screws 150, which means permits adjustment of the hands 146 and 149 relatively to one another and to the torque shaft.

The female clutch element 148 is integral with a plate 151 having holes 152 formed therein for reception of dowel pins 153 which are slidable in holes 154a formed in a frame member 154. A slide block or plunger 155 is provided to which the dowel pins 153 are fixed and which is slidable on a bushing 156. A neck or connecting portion 157 provides a rigid connection between the female clutch element 148 and the plate 151, as is most clearly shown in Figures 6 and 8. The neck portion is provided with holes 157a to receive steel balls 158, and a garter spring 158a is provided which embraces the steel balls. A sleeve 159 fixed to the outer end of the torque shaft 143a is formed with a taper at 159a to cooperate with the spring 158a in the manner described hereinafter.

It is intended that the weighing mechanism thus far described go through the following sequence of operation:

The gross or tare hand 146 is at all times locked to the torque shaft 143a. Hence, as soon as an empty drum, such as that shown at 13 in Figure 2, is deposited on the scale platform 16, the gross hand 146 will indicate the weight of the empty drum; i. e., it will tare the drum. At this instant both the slide block 155 and plate 151 are in the retracted position shown in Figure 7. Hence, the female clutch element 148 is disengaged from the male clutch element 147 and, as a result, the net hand 149 will not move with the gross hand 146. Also, the net hand 149 is meanwhile locked at its zero position on the scale of the weighing apparatus by a means hereinafter described. After an empty drum has been delivered and tared, the slide block 155, its dowel pins 153, the plate 151 and the female clutch element 148 are moved outwardly as a unit to the position shown in Figure 6. Then the clutch element 148 is latched in the position shown and the block 155 and dowel pins 153 are retracted to the position shown in Figure 4. The filling operation now commences and the net hand 149 indicates the net weight of liquid delivered to the drum.

The mechanism for accomplishing certain of these operations will now be described: Inner and outer yokes 160 and 161, respectively, are pivoted on a pin 162 which is carried by the frame 154. Both of these yokes are biased in clockwise direction as viewed in Figure 4, by expansion springs 163 and 164, respectively, which are shown in Figures 4 and 5. At the left-hand end of the inner yoke 160, as viewed in Figure 4, pins 165 are provided which are more clearly shown in Figure 8. As there shown, the pins 165 are received in slots 166 formed in the slide block 155. Also a leaf spring 167 is provided for each of the slots 166, each such spring being fixed at 167a to the inner yoke 160 and bearing at its left-hand end, as viewed in Figure 6, against the outer side of a slot 166 to urge the block 155 resiliently outwardly, i.e., toward the male clutch element 147.

The outer yoke 161 is provided at its left-hand end, as viewed in Figures 4 and 5 with a latch means 168. As is most clearly shown in Figure 6, an insert 169 is fixed to the outer end of the yoke 161 by means of a screw 170 which extends through a wide slot 170a, by which means the insert 169 can be adjusted inwardly and outwardly to adjust the relation of its beveled corner 171 to the cooperating beveled corner 172 of a latch block 173. The latch block 173 is pivotally mounted at 174 on the frame 154 and it is urged outwardly or to the left as viewed in Figure 6, by an expansion spring 175 seated in a socket 175a formed in the frame member 154. The engagement of the beveled corners 171 and 172 is such that the more powerful springs 164 (which are shown in Figure 5)

will overcome the counteracting force of the spring 175 and, unless it is otherwise restrained, the latch block 173 will pivot counterclockwise to allow the outer yoke 161 to pivot clockwise as viewed in Figure 6.

A latch finger 177 is provided which is pivoted on a stud 178 which is threaded into the frame member 154. The latch finger 177 is urged in counterclockwise direction, as viewed in Figure 5, by an expansion spring 179 so as normally to lie in the path of the latch block 173. The latch block 173 and latch finger 177 are formed with cooperable notches 173a (which is best shown in Figure 6) and 177b (which is best shown in Figure 5), respectively, whereby, when the outer yoke 161 is rocked to the position shown in Figure 6, the latch finger 177 will hold the beveled corners 171 and 172 in engagement and will latch the outer yoke 161 in the position shown in Figure 6.

The outer yoke 161 is provided with pins 185 which are shown in Figures 5 and 8 and are seated in slots 186 formed in the plate 151 which is integral with the female clutch member 148. Referring to Figure 6, an operating means for the yokes 160 and 161 is provided in the form of a plunger or piston 187 which is slidable in a cylinder 188 formed in the frame member 154. The cylinder 188 is supplied with fluid pressure through a passage 189. A rod 190 has a socketed outer end which bears against a steel ball 191 seated in a socket 192 formed in a cross member 193 which is fixed to the inner yoke 160.

The operation of the weighing mechanism thus described and apart from the control system, is as follows: As explained above, while an empty drum is being tared by the gross hand 146, the slide block 155, the dowel pins 153 and the plate 151 are all in the retracted position shown in Figure 7. When the drum has been tared, a short pulse of fluid pressure is delivered through the passage 189 to the cylinder 188 to drive the piston 187 outwardly, hence to rock the inner yoke 160 counter clockwise as viewed in Figure 6. This rocking movement carries the slide block 155 outwardly, and with it the dowel pins 153, the plate 151 and the female clutch element 148, to the position shown in Figure 6 through the medium of the leaf springs 167 and pins 165. As the garter spring 158a and steel balls 158 slide or roll down the tapered surface 159a, the spring will contract and snap the plate 151 to the position shown in Figure 6 with a very rapid action. During this portion of the weighing cycle, engagement of the pins 185 (see Figure 8) with the plate 151 will cause movement of the outer yoke 161 with the inner yoke 160. Operation of the latch means 168 will latch the outer yoke in the position shown in Figure 6; i.e., it will lock the clutch elements 147 and 148 together so that henceforward the gross hand 146 and net hand 149 must move together.

Since only a short pulse of pressure is delivered to the cylinder 188, the piston 187 is free to return, and it does return in response to the expansive force of the springs 163. The slide block 155 and dowel pins 153 therefore return to the retracted position shown in Figure 4. The net hand 149 is now not only locked to the gross hand 146 but is free to rotate therewith as liquid is delivered to the drum.

At the conclusion of the filling operation and when the filled drum is moved from the platform 16, the clutch elements 147 and 148 will rotate back to their zero positions. A finger 196 on the plate 151 will strike the right-hand end of the latch finger 177 as viewed in Figure 6, and will pivot it to release the latch block 173. As a consequence the outer yoke 161 is unlatched and is free to return, and it does return under the urging of the springs 164. In returning, the outer yoke 161 and its pins 185 (see Figure 8) disengage the female clutch element 148 from the male clutch element 147, hence disengage the net hand 149 from the gross hand 146. This completes a cycle in the weighing operation.

The net weighing operation (i.e., the weighing of the empty drum and the continuous weighing of the liquid content of the drum as it is being filled) has thus been described in detail. As stated hereinabove, it is an important object of the invention to so integrate and time this operation with the supply of oriented drums to the filling and weighing station, and with the filling operation, that the filling operation will not commence until the empty drum on the scale platform 16 has been tared and other elements of the apparatus are in a proper state of readiness, and that, when the filling operation is terminated and the filled drum is removed from the scale platform, the weighing mechanism will be restored to its normal zero position. The integrating and control means employed for this purpose is illustrated in Figure 3.

Referring now to Figure 3, and as described hereinabove, as the pusher means 15 pushes an oriented drum 13 from the orienting station 11 to the weighing and filling station 12, the cam 18 (which is carried by and moves with the pusher 15) merely pivots and does not operate valve 27, which remains in its normally closed position.

The oriented drum is deposited by the pusher on the scale platform 16 and its empty weight is measured in the manner described above with reference to Figures 4 to 9. Meanwhile the pusher 15 is retracted and, during its return stroke, the cam 18 contacts roller 25 which rides up the rise 20 onto the dwell 19. This opens the valve 26 which, as shown in Figure 3, is supplied with fluid under pressure through a line 200 from any suitable source (not shown) of liquid or gas under pressure. Fluid then passes through a line 201 to the passage 189 (see also Figures 4, 6 and 7) thence to cylinder 188 to activate the net weighing instrumentality in the manner described hereinabove.

The spacing of the valve 27 and its roller 25 from the scale platform 16 is such that, by the time the cam 18 contacts the roller 25, the gross weighing instrumentality will have come to equilibrium, the empty weight of the drum will have been measured and other operating elements of the apparatus will have come to a proper state of readiness.

The momentary pressure pulse produced by the cam 18 during the return stroke of the pusher 15 also initiates operation of the filling mechanism, by transmission of the pulse through a branch line 202 to a control mechanism 203 which is operatively connected to the filling mechanism by means generally indicated as 204. The detailed construction and operation of a suitable type of control mechanism 203 and connecting means 204 will be found in the parent application.

At the conclusion of the filling operation, the lance 17 is closed (preferably being partially closed or throttled just prior to complete closure as described in the parent application) and it is retracted from the filled drum, which will by then contain a predetermined weight of liquid. The filled drum is removed from the scale platform, e.g., by an extension (not shown) of the pusher 15 during the next cycle when the next empty drum is deposited on the scale platform. As the filled drum is removed, the torque shaft 143a and gross hand 146 will rotate back to zero position. It is, however, advantageous to provide a means for positively rotating the net hand 149 back to its zero position.

As explained hereinabove, when a filled drum is removed from the scale platform 16, the torque shaft 143a rotates both the clutch elements 147 and 148 back to their normal position, but when the finger 196 strikes latch finger 177 (see Figure 6) the outer yoke 161 returns to its normal position under the urging of springs 164. This disengages the net hand 149 from the gross hand 146. To positively rotate the net hand back to zero position and to rotate it with sufficient force to insure release of the latch 168 (see Figure 6), a means is provided which is illustrated in Figure 3.

As shown in Figure 3, the pusher 15 is operated by hydraulic means including a cylinder 205 within which is a reciprocable, double-acting piston 206 having a rod 207 which is operatively connected to the pusher. The cylinder 205 is supplied with hydraulic fluid under pressure through lines 209 and 210 by means of pressure control and supply means 211. The pressure control and supply means 211 is described in detail in the parent application.

During the forward stroke of the pusher 15, fluid under pressure is supplied to cylinder 205 through the line 210 and drains through line 209, and during the return stroke the flow of fluid is reversed. Branch lines 215 and 216 connect lines 209 and 210, respectively, to the bottom and top, respectively, of a cylinder 217 within which a double-acting piston 218 is reciprocable. The piston 218 is connected by a rod 219 to a counter weight 220 which is in registry with the scale beam 221 of the weighing mechanism and with a plate 222 affixed to the scale beam. The rod 219 is slidable through the upper end of the counter weight 220 (which is cup-shaped), and it has a retaining knob 219a at its lower end.

During each forward stroke of the pusher 15, fluid under pressure passes through the branch line 216 to the upper end of the cylinder 217 and pushes the piston 218 downwardly. Fluid bleeds from the bottom of cylinder 217 through line 215. Downward movement of the rod 219 deposits the counterweight 220 on the scale beam 221, which is operatively connected to the torque shaft 143a (see Figure 6). The counterweight 220 positively actuates the scale beam 221 to cause the net hand 149 to return to its zero position and to operate the latch finger 177 and release the latch 168. The loose, sliding connection between the counterweight 220 and rod 219 serves to prevent damage to the weighing mechanism which might be caused by direct action of the rod 219. During the return stroke of the pusher 15, the counterweight 220 remains in its down position during a short interval of time, after which it is lifted from the scale beam 221 by reason of flow of fluid in the reverse direction.

This feature—the operation of the counterweight 220—is important because it insures disengagement of the latch 168. It is also important because it positively rotates the net hand 149 back to zero. The significance of this latter function can be illustrated as follows: Assume that a drum weighing twenty pounds is deposited on the scale platform. The gross hand 146 will rotate to the corresponding position, to indicate 20 pounds. Meanwhile the net hand 149 remains at zero until it is engaged with the gross hand and the filling operation commences. At the conclusion of the filling operation, when the filled drum is pushed from the scale platform 16, the gross and net hands 146 and 149 will return and, until they are disengaged, they will maintain the same relative positions; i.e., the gross hand will indicate 20 pounds more than the net hand. If the next drum weighs, say, 25 pounds, and if it is deposited on the scale platform 16 before the gross and net hands 146 and 149 are disengaged, the torque shaft 143a will rotate the gross hand 146 to 25 pounds, hence it will not rotate the net hand 149 to zero. The counterweight 220, however, will positively rotate the torque shaft until the net hand is at zero and strikes the latch finger 177 with sufficient force to release the latch 168. This is accomplished when the net hand 149 is at zero, and it results in disengagement of the clutch elements 147 and 148. The springs 163 (see Figure 4) will snap the plate 151 into engagement with the dowel pins 153. The net hand 149 is, therefore, locked at zero position until commencement of the next filling cycle.

It will, therefore, be apparent that an apparatus has been provided which automatically tares an empty container, then continuously indicate its net weight as it is filled; which performs this cycle of operation repeatedly as empty containers are supplied; and which insures that the empty weight or tare of each container is accurately measured and that the apparatus is in a proper state of readiness before the net weighing and filling operations commence. The apparatus also embodies a feature which insures that the net weighing instrumentality is returned to its zero position, and that it is disengaged from the gross weighing instrumentality after the conclusion of the filling operation.

We claim:

1. Automatic net weighing and filling apparatus comprising: weighing apparatus including a scale platform, a gross weighing instrumentality operatively connected to the scale platform for sensing the tare and gross weight of a container on the platform immediately that an empty container is deposited on the platform and a net weighing instrumentality normally disconnected from the weighing platform; automatic filling means for filling a container on said platform; connecting means for operatively connecting the net weighing instrumentality to the platform; conveyor means for transporting containers in sequence to the platform, said conveyor means having a forward motion for depositing a container on the platform and a return motion; and trigger means actuated by the conveyor means during the return motion thereof to actuate said connecting means, said trigger means serving to initiate operation of the filling means and to actuate the connecting means after the gross weighing instrumentality has sensed the tare of the container and the weighing apparatus is in a state of equilibrium; said apparatus also comprising means for automatically terminating operation of the filling means when a predetermined net weight has been registered.

2. Automatic net weighing and filling apparatus comprising: weighing apparatus including a scale platform, a gross weighing instrumentality operatively connected to the scale platform for sensing the tare and gross weight of a container on the platform immediately that an empty container is deposited on the platform and a net weighing instrumentality normally disconnected from the weighing platform; automatic filling means for filling a container on said platform; connecting means for operatively connecting the net weighing instrumentality to the platform; reciprocable conveyor means for transporting containers in sequence to the scale platform, said conveyor means having a forward stroke for depositing a container on the platform and a return stroke; and trigger means actuated by the conveyor means on the return stroke thereof to actuate said connecting means, said trigger means serving to initiate operation of the filling means and to actuate the connecting means upon the lapse of a predetermined interval of time after an empty container has been deposited on the platform; said apparatus also comprising means for automatically terminating operation of the filling means when a predetermined net weight has been registered.

3. Net weighing apparatus comprising weighing means for continuous net weighing of a vessel and its contents, such weighing means comprising a platform to support said vessel, gross weighing means for indicating the tare of the empty vessel immediately when deposited on said platform and for continuously indicating the gross weight of the vessel and its contents as the vessel is filled, and a net weighing instrumentality, normally inoperative and disconnected from said gross weighing means, means for operatively connecting said net weighing instrumentality to said gross weighing means, means for transporting a vessel from a starting position to said platform and retractable from the platform to said starting position and means actuated by said transporting means during retraction thereof to operate said connecting means to effect an operative connection between said gross weighing means and net weighing instrumentality after a vessel has been deposited on the platform and its tare has been indicated by the gross weighing means.

4. A filling and net weighing apparatus comprising: weighing means for continuous net weighing of a vessel and its contents, such weighing means comprising a platform to support said vessel, gross weighing means for indicating the tare of the empty vessel immediately when deposited on said platform and for continuously indicating the gross weight of the vessel and its contents as the vessel is filled, and a net weighing instrumentality which is normally inoperative and disconnected from said gross weighing means, and means for operatively connecting said net weighing instrumentality to said gross weighing means; automatic filling means for filling a vessel on said platform; means for transporting a vessel from a starting position to said platform and retractable from the platform to said starting position; and means actuated by said transporting means during retraction thereof to initiate operation of said filling means and to actuate said connecting means to effect an operative connection between said gross weighing means and net weighing instrumentality after a vessel has been deposited on the platform and its tare has been indicated by the gross weighing means; said apparatus also comprising means for automatically terminating operation of the filling means when a predetermined net weight has been registered.

5. A filling and net weighing apparatus comprising; weighing means for continuous net weighing of a vessel and its contents, such weighing means comprising a platform to support said vessel, gross weighing means for indicating the tare of the empty vessel immediately when deposited on said platform and for continuously indicating the gross weight of the vessel and its contents as the vessel is filled, and a net weighing instrumentality which is normally inoperative and disconnected from said gross weighing means, and means for operatively connecting said net weighing instrumentality to said gross weighing means; automatic filling means for filling a vessel on said platform; means for transporting a vessel from a starting position to said platform and retractable from the platform to said starting position; and means actuated by said transporting means during retraction thereof to initiate operation of said filling means and to actuate said connecting means to effect an operative connection between said gross weighing means and net weighing instrumentality upon the lapse of a predetermined interval of time after an empty vessel has been deposited on the platform; said apparatus also comprising means for automatically terminating operation of the filling means when a predetermined net weight has been registered.

6. Net and gross weighing apparatus comprising a weighing mechanism, a gross weighing instrumentality normally engaged with said weighing mechanism to sense the tare and gross weight of a container immediately that a container is deposited on the weighing apparatus, a net weighing instrumentality normally disengaged from said weighing mechanism, a clutch for engaging the net weighing instrumentality with the weighing mechanism when the tare of an empty container has been sensed and for maintaining such engagement during a filling operation and thereafter while the gross weighing instrumentality is returning to its zero position, and counterweight means operable to exert a counteracting force on the weighing mechanism during the return movement of the gross weighing instrumentality to positively return the net weighing instrumentality to zero position.

7. Net and gross weighing apparatus comprising a weighing mechanism, a gross weighing instrumentality normally engaged with said weighing mechanism to sense the tare and gross weight of a container immediately that a container is deposited on the weighing apparatus, a net weighing instrumentality normally disengaged from said weighing mechanism, a clutch for engaging the net weighing instrumentality with the weighing mechanism when the tare of an empty container has been sensed and for maintaining such engagement during a filling operation and thereafter while the gross weighing instrumentality is returning to its zero position, and counterweight means operable to exert a counteracting force on the weighing mechanism during the return movement of the gross weighing instrumentality to positively return the net weighing instrumentality to zero position and to disengage said clutch.

8. Net and gross weighing apparatus comprising: a weighing mechanism, a gross weighing instrumentality and a net weighing instrumentality having a zero position, said gross weighing instrumentality being engaged at all times with said weighing mechanism; a normally disengaged clutch for engaging the net weighing instrumentality with the weighing mechanism, trigger means for engaging said clutch; a latch for latching the clutch in engaged position; release means for releasing the latch to allow disengagement of the clutch, said release means operating when the net weighing instrumentality reaches its zero position; and counterweight means operable positively to return the net weighing instrumentality to its zero position.

9. Net and gross weighing apparatus comprising: a weighing mechanism, a gross weighing instrumentality having a zero position and a net weighing instrumentality having also a zero position, said gross weighing instrumentality being engaged at all times with said weighing mechanism; a normally disengaged clutch for engaging the net weighing instrumentality with the gross weighing instrumentality; trigger means for engaging said clutch; a latch for latching the clutch in engaged position; release means for releasing the latch to allow disengagement of the clutch, said release means operating when the net weighing instrumentality reaches its zero position; and counterweight means operable positively to return the net weighing instrumentality to its zero position.

10. Net and gross weighing apparatus comprising: a weighing mechanism, a gross weighing indicator normally connected to and operated by said weighing mechanism and a net weighing indicator normally disengaged from said weighing mechanism, both said indicators having a zero position; a normally disengaged clutch for engaging the net weighing indicator with the weighing mechanism; trigger means for engaging said clutch; a latch for latching the clutch in engaged position; release means for releasing the latch to allow disengagement of the clutch, said release means operating when the net weighing indicator reaches its zero position; and counterweight means operable positively to return the net weighing indicator to its zero position.

References Cited in the file of this patent

UNITED STATES PATENTS

| | | |
|---|---|---|
| 1,402,934 | Hoepner | Jan. 10, 1922 |
| 1,623,820 | West | Apr. 5, 1927 |
| 1,986,069 | Richard | Jan. 1, 1935 |
| 2,067,743 | Weckerly | Jan. 12, 1937 |
| 2,085,345 | Tuttle | June 29, 1937 |
| 2,351,606 | Gold et al. | June 20, 1944 |
| 2,489,776 | Hooper | Nov. 29, 1949 |
| 2,516,456 | Fischer | July 25, 1950 |
| 2,548,473 | Gregory | Apr. 10, 1951 |
| 2,610,052 | MacGeorge | Sept. 9, 1952 |
| 2,610,843 | Schellentrager | Sept. 16, 1952 |
| 2,620,154 | Christensen et al. | Dec. 2, 1952 |
| 2,678,206 | Muldoon et al. | May 11, 1954 |
| 2,793,659 | Guerard | May 28, 1957 |
| 2,925,983 | Kennaway et al. | Feb. 23, 1960 |
| 2,926,010 | Kennaway et al. | Feb. 23, 1960 |

FOREIGN PATENTS

| | | |
|---|---|---|
| 517,770 | Belgium | Aug. 18, 1953 |
| 771,052 | Great Britain | Mar. 27, 1957 |